April 12, 1955 — A. RONNING — 2,706,121
VEHICLE WHEEL ARRANGEMENT FOR CONTROLLING
VIBRATION OF ROADWAY MATERIAL
Filed May 2, 1951 — 5 Sheets-Sheet 2

INVENTOR
ADOLPH RONNING
BY Carlsen + Hazle
ATTORNEYS

United States Patent Office 2,706,121
Patented Apr. 12, 1955

2,706,121

VEHICLE WHEEL ARRANGEMENT FOR CONTROLLING VIBRATION OF ROADWAY MATERIAL

Adolph Ronning, Minneapolis, Minn.

Application May 2, 1951, Serial No. 224,149

16 Claims. (Cl. 280—104.5)

This invention relates generally to improvements in vehicle wheel suspensions for heavy-duty and high speed vehicles of the type now so commonly used for transport of materials and goods over the highways, and more specifically relates to an improved wheel arrangement and pattern for such vehicles, by means of which the vibratory forces, working upon the roadway as the vehicle travels, may be controlled and directed at desired angles.

The maintenance of the present highway and road system of the country is becoming an increased problem due to the fact that heavy trucks and semi-trailers, which are so widely used for transporting materials and goods of all kinds, are breaking up and wearing out the highways to an alarming degree. The solution of this problem is the subject of much discussion and experiment at this time and has resulted in a tendency to restrict the load capacity of vehicles in the effort to reduce damage to the highways, as well as the attempt to so construct the highways as new ones are built, or old ones are rebuilt, as to provide for added load carrying capacities. Despite all such expedients, however, the maintenance cost of the presently constructed highways runs into hundreds of millions of dollars per year so that the problem has not as yet by any means been solved. In accordance with my invention as described in my application Serial No. 601,030, for Vehicle Wheel Compensating Suspension, filed June 22, 1945, now Patent No. 2,612,387, September 30, 1952, I have provided an improved differentially compensating wheel mechanism, present tests of which indicate it will go far toward reducing damage to the highways due to a number of advantages secured by the equal loading of all wheels of the suspension under all circumstances and the beneficial distribution of the load over a maximum surface area of the highways. The fact remains, however, that a heavily loaded vehicle traveling at high speeds will necessarily so vibrate the roadway as to cause wear and other undesirable effects thereupon and my present invention has as its primary object the provision of a wheel arrangement by virtue of which the vibratory forces and impact shocks, created by travel of the vehicle upon the roadway, will be so controlled or will be directed into such horizontal pattern as to counteract, so far as possible, the bad effects of these forces upon the roadway.

As will be presently pointed out the desirable effects created by my invention are beneficial to the ordinary concrete slab highway as well as to stabilized or bituminous surface roads and even gravel surfaced roads, but for the present the discussion will be limited to the well known form of concrete highway in order to most clearly compare the effects of my wheel suspension and arrangement with those of the ordinary vehicle. This type of highway consists of a compacted subgrade of gravel, soil or analogous materials, over which extends a ribbon of concrete to form the actual traffic carrying surface, with this ribbon interrupted at spaced points by transversely extending, resiliently packed expansion joints so that the concrete takes the form of a succession of elongated slabs of road width. Even in the case of a newly constructed highway in perfect condition, there is necessarily some resiliency in this construction and the travel of a heavily loaded vehicle at high speed results in the creation of vibrations and impact shock waves in the concrete and the subgrade below. Ordinarily such a highway is visualized as being completely smooth, but inevitably there are imperfections in the surface which, even though they are minute, are sufficient to cause a rebounding action of the wheel suspension sufficient to set up such vibration forces, and this effect is particularly noticeable at the expansion joints with the ordinary type of wheel suspension now so widely used. As the highway wears the surface gradually becomes pitted, so that vibration is increased, and this in turn brings about the gradual deterioration of the subgrade beneath the concrete slab with the result that in all too short a time there is set up what is commonly known to highway maintenance men as a pumping action, which is caused by a rocking motion of the concrete slab and the downward deflection of portions of the slab due to a lack of support from the subgrade material. It will, of course, be readily appreciated that such pumping action will become progressively worse as time goes on unless, in some fashion, the subgrade is brought back to condition for evenly supporting the concrete slabs, and that this is true is borne out by the present, quite widely used, reconditioning method by which "mud" or slushy concrete is pumped into the subgrade under very high pressure in order to fill all of the voids beneath the slab and to bring up to a level, so far as possible, the depressed portions thereof. This method is at the best only partially successful, is necessarily quite expensive and requires the breakage of holes through the slab to introduce the material into the subgrade below.

The end result of the pumping action introduced by heavy high speed traffic, as it is presently constituted, is the breaking up of the concrete slab requiring patching or complete replacement. Such breakage occurs most frequently along the lateral edges of the pavement and is caused by the fact that the present day vehicles have a pronounced tendency to so vibrate the lateral slab edges and subtending subgrade as to work out the fine material of the subgrade from beneath the slab, leaving it practically unsupported at such points, and of course aggravating the pumping tendency. Experiments have proven that this action causes the fines in the subgrade material to work out from beneath the slab in the form of a thin mud which may often be detected where it emerges from the junction of the slab and the berme or shoulder of the highway. It is this pumped out material, if it may be so termed, which is now being replaced by the method above mentioned of forcing a mud-like material under high pressure beneath the slab. In the ordinary heavy duty transport type of vehicle dual wheels are employed and as such wheels run along the edge portion of the highway the vibration forces and impact shocks, incident to the travel of these wheels over the irregularities in the road surface, cause the formation of shock waves which in large part travel outwardly with respect to the center of the roadway, and cause the loosened subgrade material to make a corresponding movement outward from beneath the lateral edge of the slab. Obviously such shock waves travel in other directions also, as they emanate from the bearing point between the tire and the road surface, but to my knowledge heretofore there has been no attempt made to desirably control the directions along which the major forces of such shock waves are exerted.

In accordance with my invention I provide a differential or compensating wheel suspension and a wheel arrangement, or pattern, by which the roadway vibrations, caused by the passage of the vehicle wheels, are concentrated and amplified in a direction which is forward and inward with respect to the edge of the roadway. Thus these vibrations tend to work the subgrade material inward rather than outward and to counteract the tendency of the subgrade material to be ejected from beneath the slab by the pumping motion thereof. Due to the differentially compensating action of my wheel suspension the vertical acceleration and deflection forces at each wheel are very materially reduced and the load on each wheel is so evenly distributed that the pumping effect itself will be reduced, but this, of course, cannot be eliminated completely and particularly where vehicles not having this desirable wheel suspension are used. I do not, therefore, expect to completely counteract and overcome the undesirable effects of heavy traffic upon presently constructed roads, but the improvement, resulting from the gradually increasing use of wheel suspensions of this nature, will increase the effective life of the highway and result in a saving in the aggregate of very considerable proportions.

As stated above my present invention has the same desirable effect upon the life of all types of highway construction now employed and in the case of bituminous or soil stabilized roads the effect may be even more pronounced, since such surfaces are normally more yieldable than concrete and vibrations are therefore greater so that the controlled vibrations, according to my invention, will have an increased beneficial effect. Bituminous surfaced roads quite apparently have the same tendency to pump and dislodge the subgrade material as is evidenced by the fact that these roads have a very pronounced tendency to break up along their edges. On gravel surfaced roads, on the other hand, the primary effect of heavy continued traffic is the development of a condition which is commonly known as a washboard surface, due to the fact that the material is worked up in the form of rhythmically spaced, transverse ridges. It is clear that the transversely aligned wheels of present day vehicles work in the gravel and subgrade up into ridges at right angles to the wheels and I contemplate that my invention, due to the fact that the concentrated vibrations are at an inwardly and forwardly directed angle, will counteract this tendency to build up such transverse ridges. Actually if the roadway was traveled only by vehicles embodying my invention there could very likely result the formation of diagonal ridges or a kind of herring-bone pattern along the roadway. Thus, the frequent passing of both conventional vehicles, and those using my improved wheel suspension and wheel pattern, would undoubtedly result in a neutralizing effect such as to smooth out the road and maintain it in a smooth condition.

Another object of my present invention is to provide what I term an improved wheel pattern for vehicle wheel suspensions in which individually, vertically movable wheels are employed, with the wheel running nearest the edge of the roadway arranged in advance of the next wheel in the inward direction so that the combined vibration or radiating shock wave patterns of the wheels will intersect and concentrate themselves into a forwardly and inwardly directed axis of maximum vibration at right angles to a line connecting the centers of the two wheels in question. Thus the vibration pattern for the wheels has a pronounced, concentrated inward component such as to tend to move subgrade or roadway material inward, rather than outward as is the case with conventional dual wheels. Further in accordance with this object of my invention and as a desirable extension thereof, I provide a wheel pattern in which all of the wheels, from one side to the other of the vehicle, are arranged in a diagonal relation with the wheel running nearest the edge of the roadway well in advance of the innermost wheels, and with intervening wheels, in the case of a four wheel suspension as an example, arranged in a diagonal line so as to further concentrate and direct the maximum vibratory forces inward from each adjacent pair of wheels.

These and other more detailed and specific objects will be disclosed in the course of the following specification, reference being had to the accompanying drawings, in which—

Figure 1:
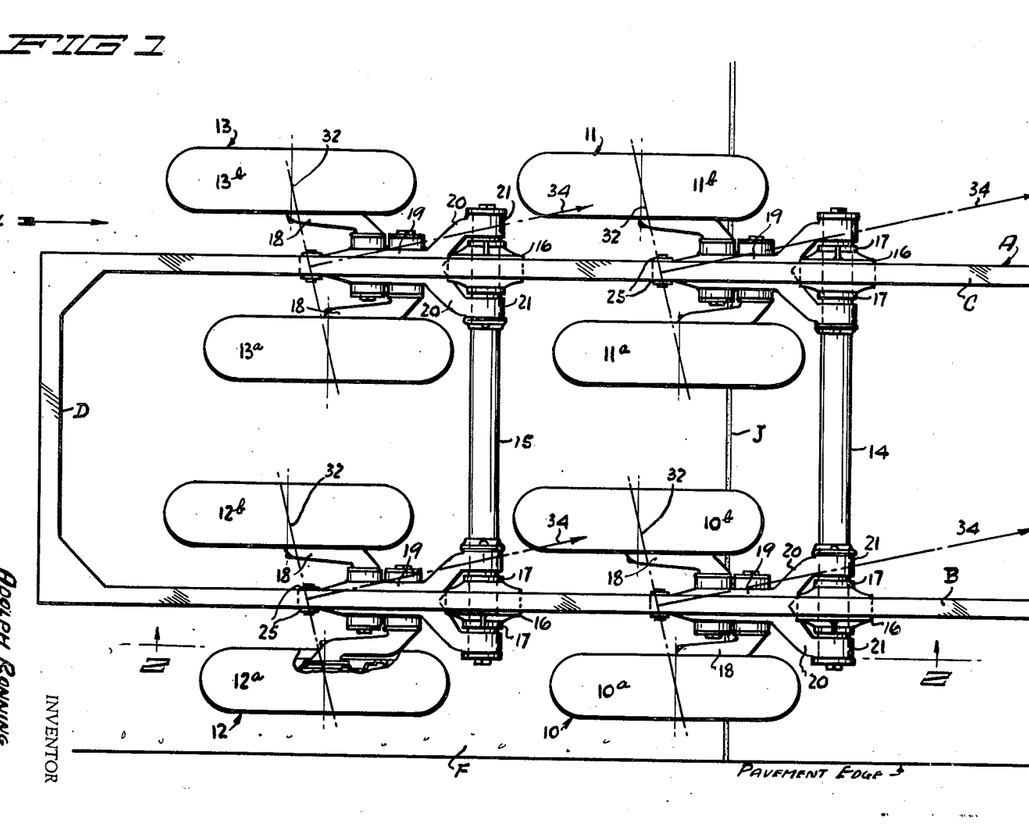
Fig. 1 is a plan view of the rear portion of a vehicle chassis frame and showing a differentially compensating wheel suspension, the individual components of which are similar to those disclosed in more detail in my earlier application previously identified, and in this view the wheels are illustrated as arranged in a desirable pattern so as to control and concentrate the roadway vibration in the desired manner, according to my present invention.

Referring now more particularly and by reference characters to the drawing, the construction of the wheel suspension of Figs. 1 and 2 will first be described. Actually this suspension, insofar as constructional details are concerned, is very similar to that disclosed in my previously identified prior application, to which attention is invited for a more complete discussion. As here shown the suspension comprises four identical wheel sets, or assemblies, designated generally at 10, 11, 12 and 13, which are arranged beneath the rear of the vehicle chassis frame A, having spaced parallel side members or channels B and C, joined at the rear by a cross member D. Each wheel assembly 10 through 13 comprises a pair of pneumatic tired wheels, indicated at 10a and 10b, 11a and 11b, 12a and 12b, 13a and 13b, thus forming an eight wheeled truck well adapted to use with the heavy-duty, semi-trailer types of vehicles now used for transporting goods and materials over the highways.

These wheels are carried from front and rear tubular cross members 14 and 15 which are supported beneath the frame A by means of brackets, indicated throughout at 16, which are affixed to the side channels B and C, and are provided with depending forked portions, having bearings 17, in which the tubes 14 and 15 are secured. The front wheel sets 10 and 11 are arranged between the tubes 14 and 15, with the rear wheel sets in trailing relation, and the individual wheels are journaled at the rear ends of cranked axles 18 having forwardly located, oppositely directed trunnion ends 18a which are journaled crosswise through housing members 19. These housing members 19 extend in a generally fore and aft direction, and at their forward ends are forked at 20 and formed with spaced bearings 21 by which they pivot on the tubes 14—15 at opposite sides of the bracket bearings 17. Thus these housing members 19 are arranged for up and down oscillating motions at their rear ends, in addition to which the cranked axles 18 may also move in the same general planes, but these axles are differentially connected by gears 22 secured upon their trunnion ends 18a, within the housings 19 and meshing together so that as either axle moves upwardly the other moves downwardly a corresponding amount. In addition the wheel sets at each side of the vehicle are longitudinally, compensatingly connected by means of fore and aft heavy leaf springs 23, the centers of which are clamped to brackets 24 having bearings at their upper ends journaled upon the rear cross tube 15. The opposite upwardly and downwardly movable front and rear ends of the springs 23 are then connected by links 25 to the rear extremities of the housing members 19 so that the spring yieldably resists upward motion of the wheels and translates such motion of either wheel set to opposite motion of the other wheel set at that side of the vehicle. As shown in Fig. 2 the spring 23 is also provided with a helper spring 26, clamped to the aforesaid bracket 24, and shackled at 27 to the main spring to assist the resilient wheel suspension action, if the same is necessary.

It is believed that the compensating and differential action of the wheel suspension assembly will be readily understood from the foregoing brief description, it being obvious that the individual wheels of each set are differentially connected, while the wheel sets at each side are connected by an oscillatable spring in such fashion that the load is transmitted through the spring to the wheels and longitudinal compensation of the up and down motions of the wheel sets is accomplished. Actual tests of pilot models of the invention very definitely prove that the equal load transmission to all of the wheels and the differential connection of the individual wheels of each set very materially reduces vertical acceleration transmitted to the vehicle and as a result minimizes shock forces transmitted to the roadway itself. In addition, these differentially connected wheels will maintain even bearing contact on the roadway, under the worst conditions, and thus the load is equally distributed over a maximum roadway surface to further reduce strain and damage thereto.

Figure 3:
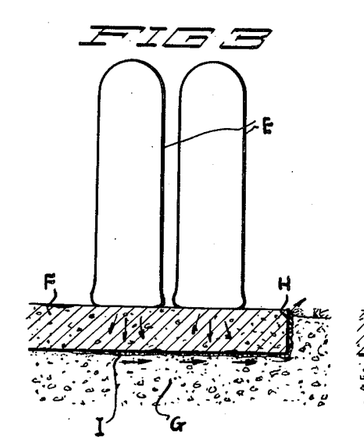
Figs. 3 and 4 are sectional detail views through the right hand edge portion of a concrete surfaced highway and diagrammatically illustrating the direction of vibration of the concrete and subgrade with conventional dual wheels and with the wheel arrangement and pattern of my invention.
Figure 4:
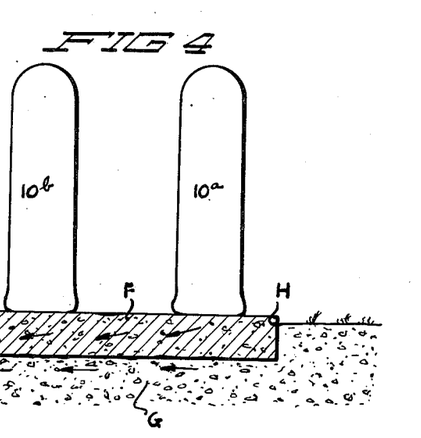

As here illustrated, all of the crank axles 18 are of the same length, but for each wheel set one of such axles is offset forwardly of the other by an amount such as to permit the differential connections of the trunnion ends 18a by means of the gears 22 affixed thereto. There results, then, a corresponding offset of the individual wheels of each wheel set, and in accordance with the present invention the right hand wheel (looking forwardly) of each wheel set is positioned forwardly by a substantial amount with reference to the left hand wheels. This is true throughout all four wheel sets and thus, while the wheels 10a and 11a, for example, are transversely aligned with each other, the left hand mates 10b and 11b of these wheels are located rearwardly and are themselves transversely aligned. In addition it will be noted that the wheels are all equally transversely spaced with respect to each other across the roadway and this is in distinct contrast with the ordinary dual wheels wherein the individual tires are very closely spaced and there is a wide space, then, at the center of the vehicle between the duals at each side. The comparative spacing as between the conventional duals and my relatively widely spaced dual wheels, if such they may be called, is graphically illustrated in Figs. 3 and 4, wherein a pair of the wheels making up the conventional dual are illustrated at E on Fig. 3, while the wheels 10a and 10b of the wheel set 10 of my invention are so designated in Fig. 4.

Figure 5:
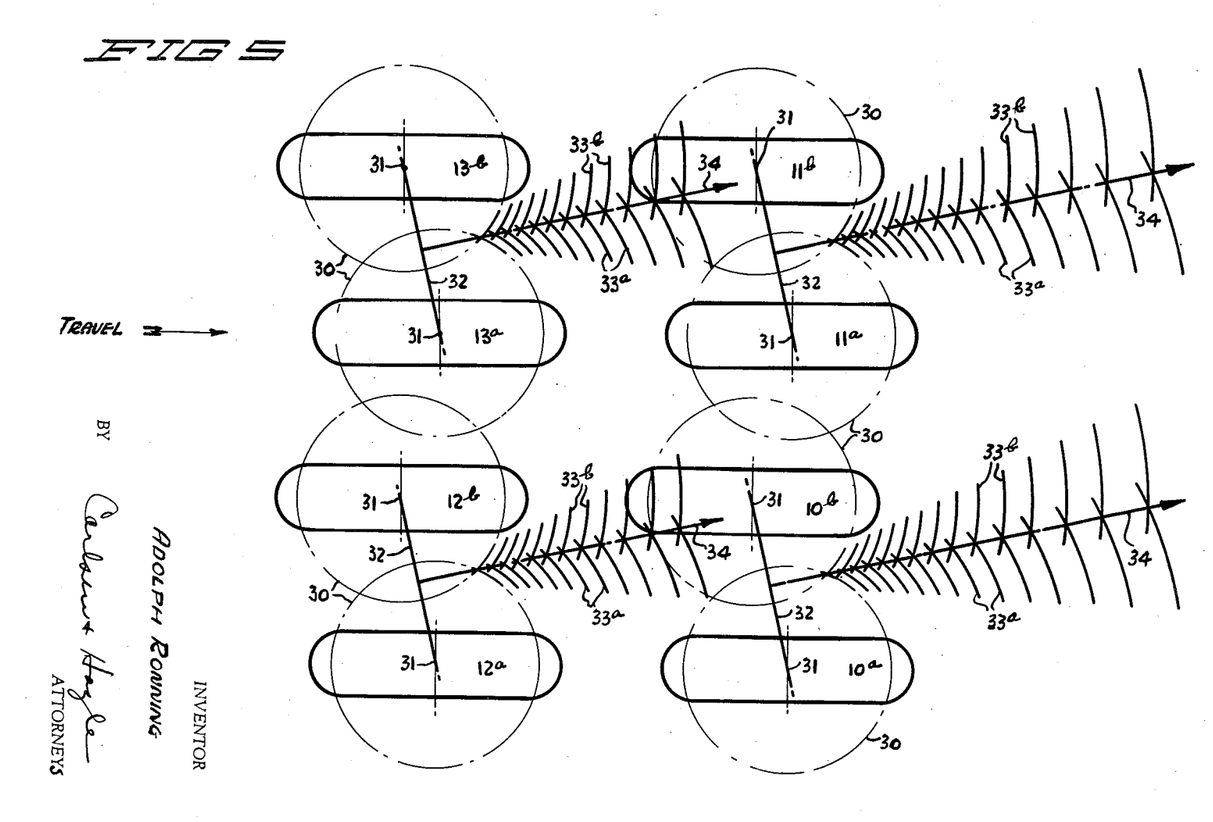
Fig. 5 is a diagrammatic view of the wheel arrangement and pattern shown in Fig. 1 illustrating the origin of vibrations or shock waves of the wheels and the manner in which such wheel pattern concentrates these forces in the desirable direction, as viewed in plan.

In describing the operation of the improved wheel suspension and wheel arrangement or pattern here presented, it must first of all be recognized that any yieldably supported vehicle wheel, as it travels over the highway surface, will have a rebounding contact with that surface as the wheel travels rapidly over surface irregularities. This is true to some extent with even a new highway or one in extremely good condition, since the surface thereof invariably has at least minor irregularities and the rapidly traveling wheel will have at least some vibratory effect upon the material making up the road surface. Each time the wheel strikes the road surface shock waves or vibrations are set up which may be considered as radiating evenly from a point of initiation, or the load bearing area at which the wheel strikes the surface. In Fig. 5, wherein the wheel pattern of Fig. 1 is duplicated, the circular broken lines 30 illustrate wave patterns which emanate radially in all directions from the centers 31 at which the various wheels strike the road surface. This may be an idealized version of this wave pattern, since the forward travel of the wheel will to some extent accentuate the pattern in the forward direction so that a forward rolling or kneading effect may be said to take place in the road surface material due to the vibration of the forwardly traveling wheel. The vibration is, of course, downward as well as horizontal, but it is with the horizontal component that the present invention is primarily concerned. Considered in the case of the single wheel it will be appreciated that the vibrations are quite likely to be of equal force at the opposite sides of the wheel and turning now to the disclosure in Fig. 3 the undesirable effect of these lateral components will first be considered. In the conventional dual wheel the individual wheels or tires thereof may be considered to operate as a unit since there is no provision for vertical compensation therebetween, as is in the case of my wheel sets, and the shock forces transmitted to the concrete slab, for example, of the pavement, as illustrated at F, will be transmitted through the slab and down to the subgrade, indicated at G. With the dual wheel running along near the edge H of the pavement slab the outwardly moving, lateral component of this vibration will result in an outward lateral dispersion and movement of the aggregate making up the subgrade, as designated by the arrows in Fig. 3, beneath the slab F. After a highway has been in service a comparatively short time the heavy loads and shocks incident to the travel of heavy-duty transport trucks will soon result in the creation of a hollow or void I along and beneath the edge of the slab F caused by the fact that the fine material is forced outwardly from beneath the slab by the pumping action thereon, previously mentioned herein. An anomalous situation soon presents itself in which the gradually increasing void, lying beneath the slab, permits tthe increased vertical defflections and pumping thereof, which in turn increases the lateral dispersion of the material of the subgrade to in turn aggravate the pumping action so that breakage along the edges of the slab soon occurs. The forward travel of the conventional vehicle, of course, accentuates the forward wave motion in the subgrade material, but in a straight line parallel with the direction of travel so that these right hand wheels act to crowd material out from beneath the slab, with what may be described as a sort of rolling and kneading motion. This, then, represents one of the problems which confronts highway maintenance people and which results in the gradual deterioration of the highways to the detriment not only of those operating heavy-duty transport vehicles but to the pleasure car users of the highways.

Various attempts have been made to so spring or suspend the wheels of transport vehicles as to reduce highway damage, but this alone is not enough, since however such wheels are connected to the vehicle the heavy loads necessarily will introduce vibrations in the road surface which, if not controlled, will cause damage thereto. As stated, the wheel suspension according to my previous application has very desirably decreased vertical deflections of the highway surface, due to the differential connection of the individual wheels and the resulting equal load transmission to each and every wheel. As compared to the dual wheels E in Fig. 3 for example the advantage is very great since if either of the individual tires of the common dual rolls over an obstruction on the road surface the entire load is transmitted through the one tire to the pavement which is, of course, not the case in the wheels 10a—10b in Fig. 4, which will retain equal load bearing contact with the road at all times. In addition, the offsetting of the wheels, one forward of the other, very desirably reduces the impact forces as the vehicle crosses the usual resiliently packed expansion joints, such as illustrated at J, with which all concrete slab highways are provided. In a vehicle with the common arrangement of dual wheels, all transversely aligned, the wheels will strike this transversely extending expansion joint at the same time, whereas in my wheel suspension half the wheels will strike the joint first, followed by the remaining wheels at an interval later. Thus as the first wheels 10a—11a, for example, cross the expansion joint J shown in Fig. 1 the load will be equal upon both sides of the joint and the tendency to rock the slab or cause it to pump at these joints is thus halved. Thus my wheel suspension as a whole may be said to start out with an advantage insofar as the transmission of vibrations and shock forces to the roadway is concerned, but in addition the wheel arrangement or pattern has a desirable effect in directing the horizontal component of these vibration forces in such fashion as to counteract and at least to some extent neutralize the undesirable outward vibration of the conventional dual wheels, which results in the condition illustrated in Fig. 3, all as will now be described.

In describing this action the effects of the wheels 10a—10b will first be considered alone, or as disassociated with the remainder of the wheel pattern, and referring to Fig. 5 it will first of all be noted that a line 32, joining the wheel centers 31, will lie at a diagonal angle to the direction of travel, with the end of the line nearest the lateral edge of the highway in advance of the inner end, due to the offsetting of the wheels. Constructing then the pattern of radiating vibrations emanating from the respective centers 31 of the wheels 10a—10b there results an intersection or overlapping of these wave lines, which are designated at 33a—33b, along an axis which extends forwardly and inwardly at right angles to the line 32 and from the center thereof, this axis being indicated by the line 34. There results then a concentration of these forward horizontal components of the vibrations or shock waves along the axis 34 so that the maximum moving effect upon the subgrade G takes place along this line and in planes adjacent and parallel thereto. Since these wheels 10a—10b operate immediately alongside the edge H of the concrete slab F this forward-inward concentration of the vibratory forces will have a tendency to move the subgrade material, along the edge of the highway, in an inward direction, as illustrated by the arrows in the subgrade in Fig. 4, in contrast with the outward movement of the subgrade material illustrated in Fig. 3. While I do not, of course, contemplate that material will actually be worked under the edge of the concrete slab, it is my belief that the concentration of the maximum subgrade vibration, along the line 34, will counteract the tendency of material to be ejected from beneath the slab by present day vehicles, with the end result that a sufficient use of vehicle embodying my present invention will materially reduce and neutralize the tendency of the highway to break up, as has been described.

It will be noted also in Fig. 5 that the other wheel sets 11, 12 and 13 will develop a corresponding series of intersecting shock waves or vibrations 33a—33b along lines 34 extending forwardly at right angles from the centers of what may be termed the base lines 32, constituting the lines of initiation of the shock forces from the staggered wheel pairs. In the eight wheel version illustrated herein the combined effect of these concentrations will have an accumulative tendency to vibrationally move the subgrade material forward and inward over the entire area of the highway to which the load is applied, as will be readily appreciated.

Figure 2:
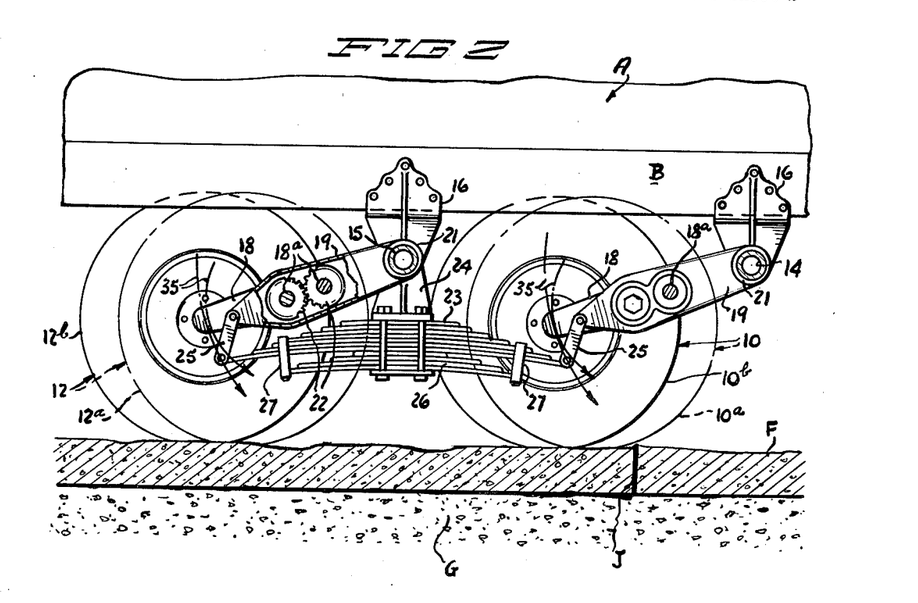
Fig. 2 is a side elevation, partially in section, of the structure shown in Fig. 1 and as viewed substantially along the line 2—2, with the near wheels of the suspension removed to better disclose the construction.

At this point attention is called to the fact, as illustrated in Fig. 2, that the up and down movements of the wheels according to my invention will occur in arcuate paths, as designated by the arrows 35, as the cranked axles 18 swing upwardly and downwardly or as the entire wheel set swings with the housing member 19. Thus the vibratory impacts against the road surface will be in a downward and forward direction, rather than in a straight up and down plane, with the desirable effect of magnifying the forward shock waves transmitted to the subgrade material. Since the wheel arrangement or pattern according to my present invention makes use of and controls these forward shock waves in order to bring the concentration thereof along the forwardly and inwardly angled lines 34, it necessarily follows that the amplification of these components of the forces involved by the arcuate swinging motions of the wheels is of material aid in obtaining the maximum beneficial effect from the wheel pattern.

While I have herein discussed the effects of the control of the vibratory patterns upon concrete highways, it will, of course, be readily appreciated that the same effect will be present upon soil stabilized or bituminous surfaced roads, which also have the same problems of maintenance due to damage by heavy, high speed traffic. These types of roads have an even more pronounced tendency to break up along their edges and since they are laid over compacted subgrades it follows as a matter of course that it is the lateral movement of the subgrade material which causes this breakage. All such roads, furthermore, have more resiliency than the concrete slab roads due to the fact that they are somewhat softer in texture and the controlled vibrations, set up by my wheel arrangement and pattern, will thus act even more strikingly to neutralize the lateral dispersion of the subgrade material and increase the life of the roads. In the case of the common gravel road the tendency is for conventional vehicles, having transversely aligned wheel patterns, to roll or knead the material up into rhythmically spaced, washboard ridges which are exactly crosswise to the direction of travel. The operation of a wheel arrangement or pattern according to my invention, over such roads, would first of all have a tendency to create such ridges to a lesser amount due to the effective differential and compensating suspension of the wheels, but more important such ridges as they build up in time would necessarily be located diagonally with reference to the direction of travel. Assuming, then, that the road is traveled by both conventional vehicles and those employing the present invention, it follows that there would be a tendency to neutralize this formation of washboard ridges in such fashion that the road would actually be smoothed out and maintained in a level condition.

Figure 6:
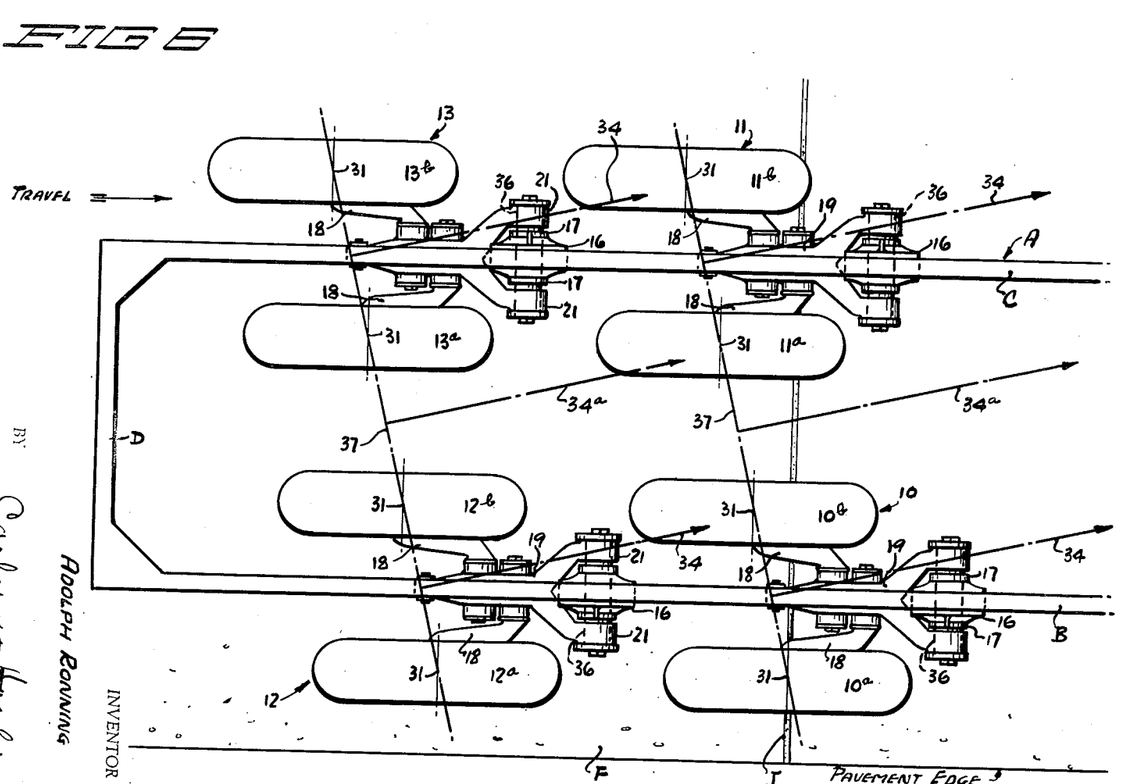
Fig. 6 is a view similar to Fig. 1 but showing a different arrangement of the wheel suspension and the wheel pattern such that the wheels are all diagonally related, with none of the wheels in transverse alignment with any other.
Figure 7:
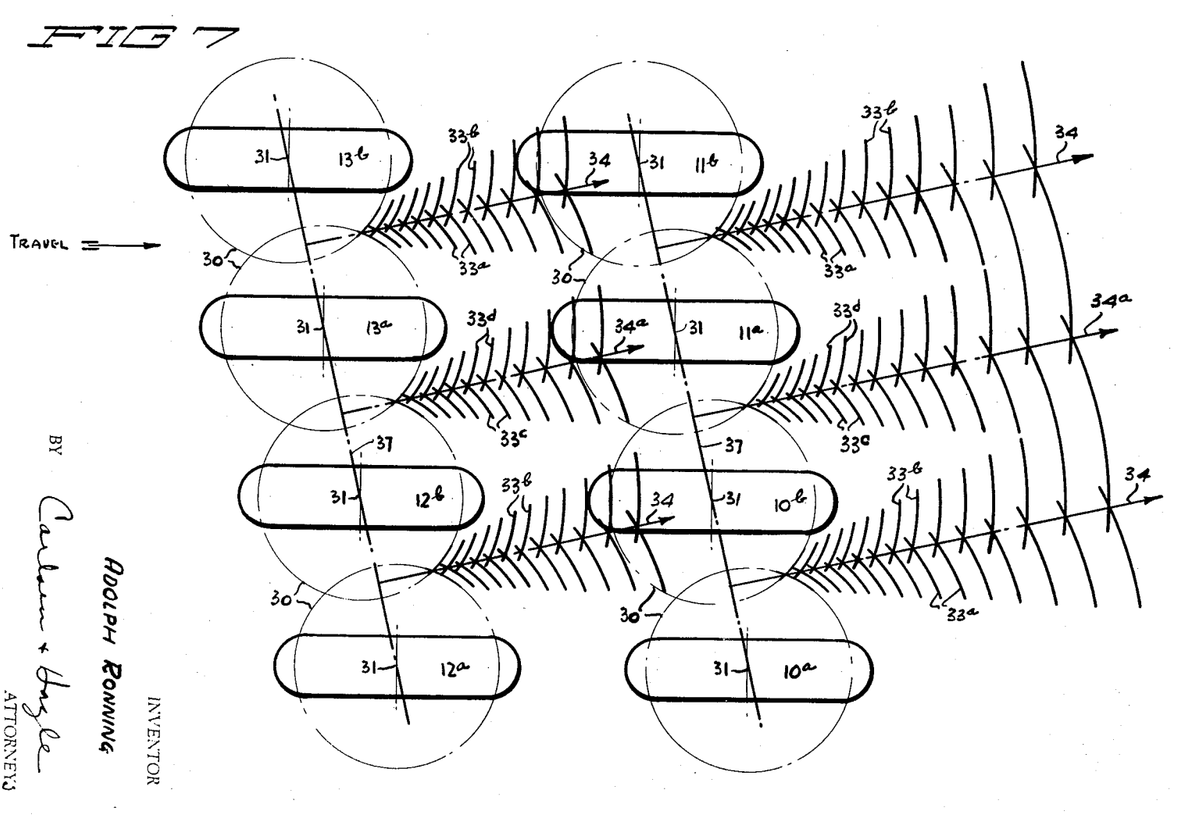
Fig. 7 is a view similar to Fig. 5 but illustrating the pattern assumed by the concentrated roadway vibrations with the wheel pattern of Fig. 6.

Turning now to Figs. 6 and 7 I have illustrated a still further improved wheel arrangement and pattern wherein all of the wheels in both front and rear rows are located in diagonal alignment, instead of in diagonally related pairs as previously shown and described. In Fig. 6 the corresponding wheel pairs 10 through 13, as well as the individual wheels 10a—10b, 11a—11b, 12a—12b, 13a—13b thereof are referred to by the same numerals as the corresponding elements of Figs. 1 and 5. Here also the wheels are journaled at the rear ends of cranked axles 18, which are journaled into and differentially connected within housings 19, forked at their forward ends to provide spaced bearings 21. Thus far the construction is identical to that shown in Fig. 1, and while not appearing in Fig. 6 it will, of course, be understood that the wheel sets at both sides of the vehicles will be compensatingly connected by the same type of springs as designated at 23 in Fig. 2. Here, however, the stiff cross tubes 14 and 15 are omitted and instead the brackets 16 carry in their bearings 17 short tubular pivot pins, which are designated throughout at 36 and which pivotally carry the forward ends of the housings 19.

In this case the pivot connections of the front and rear housings 19 are not transversely aligned and instead the wheel set 11, upon the left hand side of the vehicle, is set rearwardly of the corresponding wheel set 10 at the right hand side, with a similar relationship being set up for the rear wheel set 12 and 13. The amount of this rearward offset or set-back of the right hand or inside wheel sets 11 and 13 is such that their right hand wheels 11a—13a are located rearwardly of the corresponding wheels 11b—13b of the right hand wheel sets, by exactly the same amount as the rearward offset between the individual wheels of each differentially connected pair. This arrangement brings all of the wheels of the front wheel sets 10 and 11, and all of the wheels of the rear wheel sets 12 and 13, into diagonal alignment and a line 37, passing through the centers 31 of each row of wheels, will extend clear across the vehicle with its right hand end, or the end nearest the edge of the pavement, considerably advanced with respect to its innermost end.

Turning then to Fig. 7 wherein this wheel pattern or arrangement is duplicated, it will be noted that the radiating vibrations, as indicated by the circles 30 which emanate from the wheel centers 31, again result in an intersection or overlapping of these wave lines, as designated by the lines 33a—33b, along inwardly and forwardly angling lines of maximum or concentrated vibration, designated at 34 and originating at the centers between the wheels of each wheel set 10—13 as previously described. In addition, however, it will now be noted that the wheels 10b—11a, and 12b—13a are also offset or staggered in the same relationship, with the result that the wave patterns emanating from their centers 31 will intersect and overlap, as designated by the lines 33c—33d, along axes or lines 34a of concentrated vibrations which originate at the midpoint between these wheels. Thus with this type of wheel pattern or arrangement, for each four wheels across the width of the vehicle, there will result three forwardly and inwardly angled areas or paths of concentrated vibrations which will, of course, augment and increase the tendency to vibrate the subgrade material in the inward direction so as to even further neutralize and counteract the tendency of present day vehicles to so disturb the subgrade as to cause deterioration of the traffic bearing surface.

In Fig. 6 an expansion joint J is shown in line with the foremost wheel 10a and it will be clearly evident that the other wheel will then roll in succession across the joint, relieving it of the pounding which occurs when all wheels strike at the same time. It will further be evident that any pumping of the concrete slab at the joint J will result in an inward vibration of the subgrade material to overcome the tendency of conventional vehicles to move the material outward, which is often pronounced adjacent the expansion joints.

While I have herein used the definitions "right" and "left" as they apply to our traffic directions it is to be understood that, in countries where the direction of traffic is opposite to ours, my invention would be equally applicable and I do not limit myself to the right and left hand designations as herein used.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle wheel suspension and arrangement of the character described, comprising a pair of rear wheels at each side of the vehicle, means connecting the respective wheels of each pair for up and down vibratory motions as they travel, the right hand wheel of each pair, looking forwardly, being positioned in advance of the corresponding left hand wheel, and the wheel pair at the left side of the vehicle, also looking forwardly, being offset to the rear so that all four wheels are in a diagonal rearwardly angled line from the right to left hand side of the vehicle.

2. A vehicle wheel suspension and arrangement of the character described, comprising a pair of wheels at each side of the vehicle, means connecting the wheels to the vehicle for up and down vibratory motions as they travel, the right hand wheel of each pair, looking forwardly, being positioned in advance of the corresponding left hand wheel, and the wheel pair at the left hand side of the vehicle, also looking forwardly, being located rearwardly of the right hand pair with the right hand wheel of the left side pair to the rear of the left hand wheel of the right side pair.

3. A vehicle wheel suspension and arrangement of the character described, comprising a pair of wheels at each side of the vehicle, means connecting the wheels to the vehicle for up and down vibratory motions as they travel, the right hand wheel of each pair, looking forwardly, being positioned in advance of the corresponding left hand wheel, and the wheel pair at the left hand side of the vehicle, also looking forwardly, being located rearwardly of the right hand pair with the right hand wheel of the left side pair to the rear of the left hand wheel of the right side pair, all of said wheels being equally spaced transversely of the vehicle.

4. A vehicle wheel pattern for counteracting the tendency to vibrationally disperse subgrade material laterally outward from a roadway edge by the vibration and impact forces set up by the passing vehicle; in which pattern a pair of transversely spaced wheels is provided for each side of the rear of the vehicle, with all said wheels on a diagonal line and the wheel nearest the roadway edge traveled by the vehicle ahead of the other wheels, whereby vibrations originating from each two adjacent wheels will overlap on a line of concentrated subgrade vibration angling forward and inward and acting on the subgrade to counteract the tendency thereof to work outward to the roadway edge.

5. A vehicle wheel pattern for counteracting the tendency to vibrationally disperse subgrade material laterally outward from a roadway edge by the vibration and impact forces set up by the passing vehicle; in which pattern a pair of transversely spaced wheels is provided for each side of the vehicle, with all said wheels on a diagonal line and with each wheel, starting at the right hand side of the vehicle, in advance of the next wheel to the left whereby vibrations originating from each adjacent two wheels will intersect and overlap on a total of three inwardly and forwardly angled lines of maximum subgrade vibration.

6. A vehicle wheel pattern for counteracting the tendency to vibrationally disperse subgrade material laterally outward from a roadway edge by the vibration and impact forces set up by the passing vehicle; in which pattern a pair of transversely spaced wheels is provided for each side of the vehicle, with all said wheels on a diagonal line and with each wheel, starting at the right hand side of the vehicle, in advance of the next wheel to the left whereby vibrations originating from each adjacent two wheels will intersect and overlap on a total of three inwardly and forwardly angled lines of maximum subgrade vibration, all of the wheels being equally spaced transversely of the vehicle.

7. For controlling subgrade vibrations beneath a highway and directing said vibrations along desirable paths as described, a vehicle wheel pattern wherein a wheel set is provided for each side of the vehicle and there being a right hand wheel and a left hand wheel in each set as viewed in the direction of travel, both right hand wheels being located in advance of the corresponding left hand wheels of the wheel sets, and the right hand wheel set being also located in advance of the left hand wheel set.

8. For controlling subgrade vibrations beneath a highway and directing said vibrations along desirable paths as described, a vehicle wheel pattern wherein a wheel set is provided for each side of the vehicle and there being a right hand wheel and a left hand wheel in each set as viewed in the direction of travel, both right hand wheels being located in advance of the corresponding left hand wheels of the wheel sets, and the right hand wheel set being also located in advance of the left hand wheel set a distance such that the four wheels are located on a common diagonal line leading rearwardly from the right side of the vehicle to the left side thereof.

9. For controlling the vibration of subgrade material beneath a vehicle highway and directing said vibrations inwardly away from the edge of the highway along which a vehicle travels, a vehicle wheel suspension including a plurality of wheels, and said wheels including longitudinally spaced pairs of wheels at the side of the vehicle nearest the highway edge with the individual wheels of each pair which are nearest the highway edge offset forwardly with reference to the other individual wheels of each pair.

10. A vehicle wheel suspension and arrangement of the character described, comprising a separate pair of wheels located in transverse alignment at each side of the rear of the vehicle, means connecting the respective wheels of each pair for up and down vibratory movements as they travel, and the right hand wheels of both said pairs, looking forwardly, being positioned in advance of the left hand wheels of said pairs.

11. A vehicle wheel pattern for counteracting the tendency to vibrationally disperse subgrade material laterally outward from a roadway edge by the vibration and impact forces set up by the passing vehicle; in which pattern a pair of transversely spaced wheels is provided for each side of the rear of the vehicle, with the right hand wheel of each and every such pair, looking forwardly, positioned ahead of the corresponding left hand wheels of the pairs, whereby vibrations originating from each two adjacent wheels will overlap on a line of concentrated subgrade vibration angling forward and inward and acting on the subgrade to counteract the tendency thereof to work outward to the roadway edge.

12. A vehicle wheel suspension comprising two sets of wheel pairs at each side of the vehicle with one set in advance of the other, means supporting the wheels of each pair for upward and downward movements, and the right hand wheel of each wheel pair being offset in advance of the left hand wheel of each pair, for the purposes set forth.

13. A wheel suspension for highway vehicles, comprising tandem wheel pairs at each side of the vehicle, means mounting the individual wheels of each pair for upward and downward movements, and the individual wheel of each pair which is nearest the edge of the highway along which the vehicle travels being located in advance of the other wheel of each such pair of wheels.

14. A rear wheel suspension and pattern for highway vehicles, comprising at least two sets of tandem arranged wheel pairs at each side of the vehicle, and the individual wheels of each pair which travel nearest the outer edge of the highway being offset and arranged in advance of the corresponding inward wheels of each pair whereby vibrations set up in the highway and originating from each pair of offset wheels will intersect and cencentrate themselves on forwardly and inwardly angled lines to thereby tend to move the highway material inward from the outer edge of the highway.

15. A heavy-duty vehicle wheel suspension having a plurality of individually movably supported rear wheel pairs and arranged in a pattern such as to particularly adapt the vehicle to travel over paved slab highways without vibrationally dispersing the subgrade material out from beneath the edges of the slab; wherein at least two sets of wheel pairs are arranged in tandem at each side of the vehicle and operatively connected to the vehicle for up and down vibratory movements as the vehicle travels, and the right hand wheel of each pair being arranged forwardly of the left hand wheel of each pair whereby vibrations set up in the subgrade and originating from each wheel pair will have forwardly moving generally horizontal wave components which intersect and concentrate themselves along an axis angling inward and forward from a point midway between the individual wheels of the pair.

16. A vehicle rear wheel pattern characterized in that it counteracts the tendency to vibrationally disperse subgrade material laterally outward from a roadway edge by the vibration and impact forces set up by the passing vehicle; in which at least two sets of wheel pairs are arranged in tandem at each side of the vehicle, means differentially connecting the individual wheels of each pair for upward and downward vibratory movements, and the individual wheel of each pair which is nearest the same edge of the highway travelled by the vehicle being in advance of the opposite wheel of the pair, whereby vibrations set up by and originating from the wheels so arranged will form an overlapping horizontal forward wave form concentrating on an axis angling inward and forward from each wheel pair and acting in the subgrade to counteract the tendency of the same to work outward laterally of the roadway as the vehicle passes.

References Cited in the file of this patent

UNITED STATES PATENTS

| | | |
|---|---|---|
| 889,960 | Palmer | June 9, 1908 |
| 1,149,153 | Schleicher | Aug. 3, 1915 |
| 2,194,323 | Peterman | Mar. 19, 1940 |
| 2,459,372 | Fraunfelder | Jan. 18, 1949 |